(12) United States Patent
Rosso

(10) Patent No.: US 11,691,296 B2
(45) Date of Patent: Jul. 4, 2023

(54) ADJUSTABLE LENGTH GRABBER

(71) Applicant: Aerocraft Products LLC, Chaska, MN (US)

(72) Inventor: Philip Rosso, Chaska, MN (US)

(73) Assignee: Aerocraft Products LLC, Chaska, MN (US)

( * ) Notice: Subject to any disclaimer, the term of this patent is extended or adjusted under 35 U.S.C. 154(b) by 0 days.

(21) Appl. No.: 17/839,457

(22) Filed: Jun. 13, 2022

(65) Prior Publication Data

US 2022/0395989 A1    Dec. 15, 2022

Related U.S. Application Data

(60) Provisional application No. 63/210,128, filed on Jun. 14, 2021.

(51) Int. Cl.
*B25J 15/08*    (2006.01)

(52) U.S. Cl.
CPC ...................... *B25J 15/08* (2013.01)

(58) Field of Classification Search
CPC .............. B25J 15/08; B25J 9/104; B25J 1/04
See application file for complete search history.

(56) References Cited

U.S. PATENT DOCUMENTS

| | | | | |
|---|---|---|---|---|
| 4,946,380 A * | 8/1990 | Lee | ......................... | A61F 2/583 623/64 |
| 8,052,185 B2 * | 11/2011 | Madhani | ................ | B25J 9/1045 294/111 |
| 8,152,657 B2 * | 4/2012 | Green | .................. | A63B 57/207 294/19.2 |
| 8,690,212 B2 * | 4/2014 | Lee | ......................... | B25J 9/103 623/64 |
| 8,991,884 B2 * | 3/2015 | DeLouis | .............. | B25J 15/0009 294/111 |
| 9,039,057 B2 * | 5/2015 | Schvalb | .................. | A61F 2/586 294/111 |

* cited by examiner

*Primary Examiner* — Stephen A Vu

(74) *Attorney, Agent, or Firm* — Forsgren Fisher McCalmont DeMarea Tysver; Daniel A. Tysver; James M. Urzedowski

(57) ABSTRACT

An extendable mechanical grabber is presented for grabbing objects at a distance. The grabber has two extension portions that slide relative to one another through a mechanical engagement. A trigger on the first extension portion is mounted in a handle. The trigger pulls a cable that passes to an activator on a grabber head mounted on the second extension portion. The cable passes from the trigger, through a pulley connected to the activator, through a second pulley mounted at on the second extension portion, and back to a terminal attachment on an end of the first extension portion opposite the handle.

21 Claims, 3 Drawing Sheets

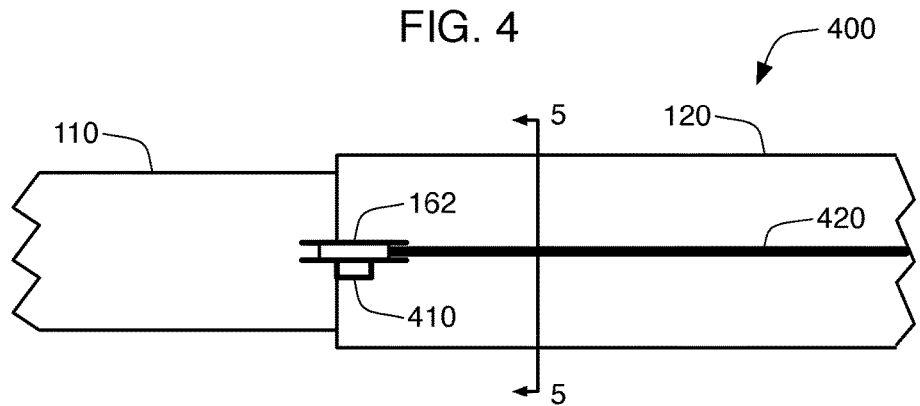
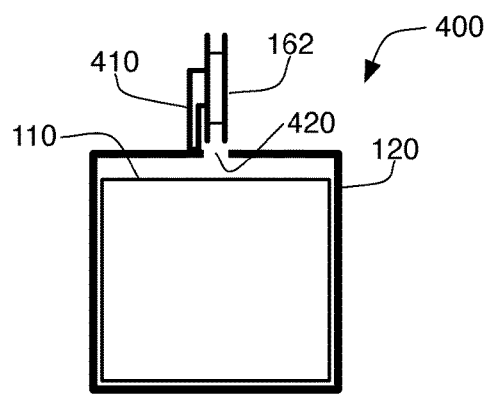
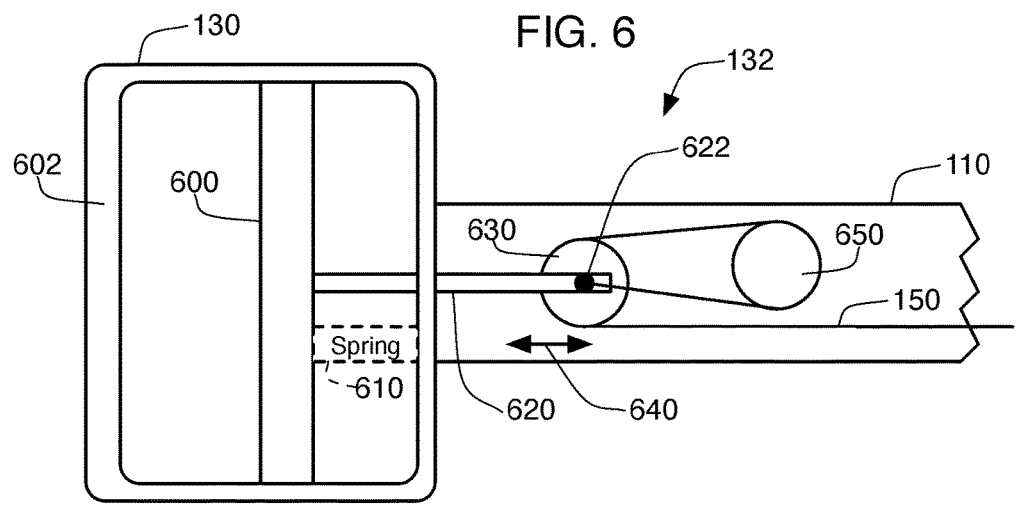

ADJUSTABLE LENGTH GRABBER

CROSS-REFERENCE TO RELATED CASES

This application claims benefit to U.S. Provisional Patent Application No. 63/210,128, filed Jun. 14, 2021, which is hereby incorporated by reference in its entirety.

FIELD OF THE INVENTION

The present invention relates to the field of manual pickers or grabbers that selectively hold an item at a distance from a user

BRIEF DESCRIPTION OF THE DRAWINGS

FIG. 4 is a top plan view of a portion of a second embodiment of an extendable grabber.

FIG. 5 is a schematic view of a cross section of the embodiment of FIG. 4

FIG. 6 is a schematic view of a handle portion of the embodiment of FIG. 1.

DETAILED DESCRIPTION

Subtitle

Figure 1:
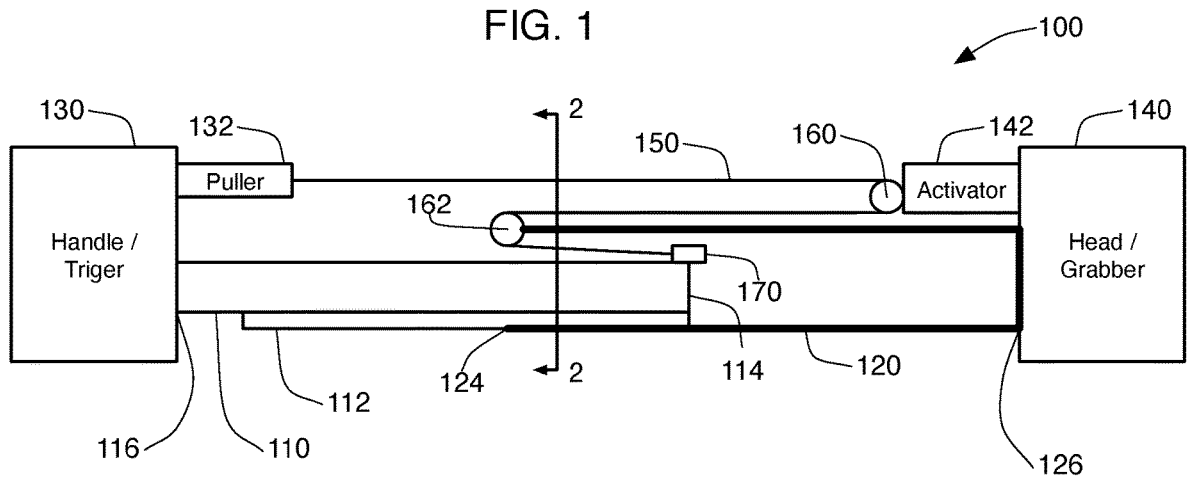
FIG. 1 is a schematic view of a first embodiment of an extendable grabber of the present invention in a first, extended position.

FIG. 1 shows an extendable grabber 100. The extendable grabber 100 is able to extend to different lengths by having a first tube or extension portion 110 (frequently referred to herein as the extension portion or extension) that is slidably engaged with a second tube or extension portion 120. More particularly, a subsection of the first extension portion including the distal end 114 engages a subsection of the second extension portion 120 including the proximal end 124. The extension portions 110, 120 may have a circular, elliptical, square, or rectangular cross-section, or may have a different shaped cross section. In one embodiment, the cross-sections of the two extension portions 110, 120 are uniform through the length where the first extension portion 110 engages with the second extension portion 120.

Figure 2:
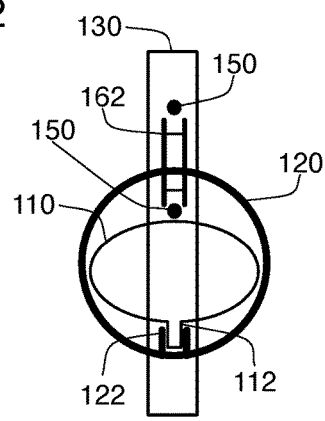
FIG. 2 is a schematic view of a cross section of the embodiment of FIG. 1.

In one embodiment, the engagement between the extension portions 110, 120 is through an engagement mechanism 112, which is best seen in the cross-sectional view of FIG. 2. This cross-sectional view is still schematic in nature, as elements are not hatched to show the materials used for construction. nonetheless, the second extension portion 120 is accurately shown as hollow at cross-section line 2, with the first extension portion 110 being present within this hollow interior. The engagement mechanism 112 is shown in FIG. 2 as a protrusion on an exterior surface of the first extension portion 110 that engages with and glides within a mating track 122 on an interior surface of the second extension portion 120. In other embodiments, the exterior of the one extension portion, such as first extension portion 110, is sized as to slidably engage with the interior of the other extension portion, such as second extension portion 120.

In the preferred embodiment, it is important that the first extension portion 110 does not rotate with respect to the second extension portion 120. This is accomplished automatically if protrusion 112 on one portion 110, 120 is engaged with a mating track on the other portion 110, 120. Alternatively, if one portion 110, 120 is slidably engaged in the other having a similar cross-sectional shape, a non-circular cross-section could be used to prevent rotation. While a minimal amount of rotation may be allowed, significant relative rotation (greater than 20 degrees) is generally prevented.

A handle or trigger portion 130 is affixed to one end (the handle end 116) of the first extension portion 110. A head or grabber portion 140 is affixed to an end (the head end 126) of the second extension portion 120. In the preferred embodiment, both the handle 130 and the head 140 are affixed to the ends 116, 126 of the extension portions 110, 120 that do not engage with the other extension portion 120, 110.

The handle 130 is actively engaged with the head 140 through a cable, wire, string, or similar connector 150 (collectively referred to herein as a "cable" for simplicity). The handle 130 utilizes a puller portion 132 that is capable of providing a pull on the cable 150. The head 140 has an activator 142 that engages with the cable 150 so that when the puller 132 pulls on the cable 150, the pulling pulls on the activator 142 of the head 140. In one embodiment, the head 140 is a "grabber" with two or more arms that close together when the activator 142 is pulled. This type of grabber head 140 is capable of grabbing an item and holding the item as long as the cable 150 is being pulled by the puller 132 of the handle 130.

In the embodiment shown in FIG. 1, the cable 150 is run through one or more pulleys 160, 162. In embodiment 100, a first pulley 160 is attached to the activator 142 of the head 140. A second pulley 162 is attached to a proximal end 124 of the second extension portion 120. The cable 150 runs from the puller 132 of the handle 130 through the pulley 160 attached to the activator 142, back to the pulley 162, and finally to a terminal attachment 170. This terminal attachment 170 is mounted to the distal end 114 of the first extension 110. While the pulley 162 is affixed to the proximal "end" 124 of the second extension portion 120 and the terminal attachment 170 is affixed to the distal "end" 114 of the first extension portion 110, the word "end" need not define the exact terminus of these portions 110, 120, as any location within twenty percent of the terminus of these portions 110, 120 may still be considered the end.

Note that while FIG. 1 shows the cable 150 running from the puller 132 to the top of pulley 160, some embodiments would run the cable 150 from the puller 132 to the bottom of pulley 160, and then run from the top of pulley 160 to the top of pulley 162. In other embodiments, there is no "top" or "bottom" of any pulley 160, 162, as the pulleys 160, 162 are not mounted to the device 100 in a way that could be considered vertical with respect to the second extension 120.

Figure 3:
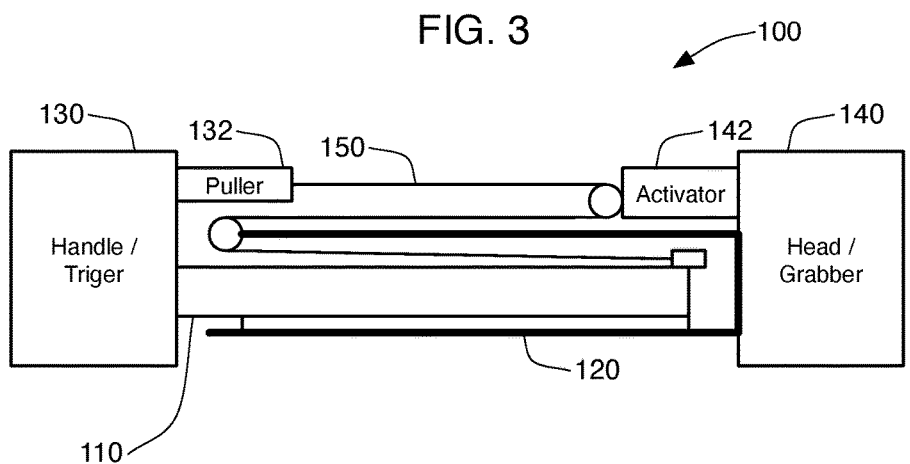
FIG. 3 is a schematic view of the embodiment of FIG. 1 in a second, contracted position.

By running the cable 150 in this manner, the first extension 110 is able to be extended relatively away from the second extension 120 so as to elongate the extendable grabber 100. In addition, the extendable grabber 100 can also be retracted so that the first extension 110 runs parallel to or within (or outside) the second extension 120, as shown in FIG. 3. FIGS. 1 and 3 effectively show the same extendable grabber 100 in an extended position (FIG. 1) and a retracted position (FIG. 3). In both positions, the cable 150 is run between the same origin at puller 132 through the pulleys 160, 162, to the terminal attachment 170.

More importantly, in both positions (and all intermediate positions) the total length of the cable 150 remains unchanged. This means that if the handle 130 were to cause the puller 132 to pull the cable 150, a middle part of the cable must pull the activator 142 regardless of whether the extendable grabber 100 is in the extended or retracted position, or somewhere in-between. Furthermore, if a user is able to hold the handle so as to provide a pull on the puller 132 (such as by continually holding a trigger 130), it is possible to change the position of the extendable grabber 100 between the extended and retracted positions while maintaining a constant pulling force on the puller 132.

This capability allows a user, for instance, to extend the extendable grabber 100 to its full extend, use the handle 130 to close the grabber head 140 around an object, retract the extendable grabber 100 to a shorter length while maintaining the grabber head 140 in a closed position with a consistent level of force, and then open the grabber head 140 by releasing the pressure on the puller 132 once the object that was grabbed is closer to the user.

Note that the cable 150 in FIG. 1 runs around pulley 162 and within the interior of the second extension 120 so as to reach the terminal attachment 170. This can be accomplished as is shown in FIG. 1, with the pulley 162 mounted so as to guide the cable 150 to the interior of the second extension 120. FIG. 4 shows an alternative embodiment 400 from a top, plan view, while FIG. 5 shows this same embodiment in a top-up, cross-sectional view. In this embodiment, the pulley 162 is mounted on the top of the second extension 120 by a mounting bracket 410. A slot 420 is also provided on the top of the second extension 120. The cable 150 (not shown in the figures) can rotate around the pulley 162 and access the terminal attachment 170 attached to the first extension 110 through this slot 420. In another embodiment, the terminal attachment 170 can be attached to the distal end 114 of the first extension 110 and then extend through the slot 420. The portion of the terminal attachment 170 that extends through the slot 420 can then attach to the cable 150 on the exterior of the second extension 120. In this embodiment, the cable 150 remains on the outside of the second extension 120. Alternatively, the cable 150 itself can pass through the slot 420 into the interior of the second extension 120 in order to attach to the terminal attachment 170.

FIG. 6 shows one embodiment of the handle/trigger portion 130 in more detail. A moveable trigger 600 is positioned with a non-moving handle portion 602 so that it can be slid or otherwise moved with respect to the non-moving handle portion 602. In one embodiment, a spring 610 is operatively engaged with both the trigger 600 and the non-moving handle portion 602 so that after active movement of the trigger 600 by the user into an activating position, the spring provides tension to urge the trigger 600 back to a resting position when the user stops applying pressure to the trigger 600. The spring 610, while adding convenience, is not a requirement for operation of the device 100.

The handle/trigger portion 130 engages with a puller portion 132 to pull the cable 150 when the trigger 600 is pulled. In the embodiment shown in FIG. 6, the puller portion 132 comprises a rod or other attachment 620 that is physically attached to the cable 150. In this case, the rod 620 attaches to the cable 150 at attachment point 622. This point 622 is also shown as a central axle to a moveable puller pulley 630. The rod 620 moves the attachment point 622 and the moveable puller pulley 630 whenever the trigger 600 is moved, as is shown by arrows 640. In other embodiments, the cable 150 can attach directly to the trigger 600 or the rod 620, since the trigger 600, rod 620, and attachment point 622 all move together when the trigger 600 is moved.

The cable 150 starts at the attachment point 622 and then wraps around a static puller pulley 650. The cable then returns and wraps around the moveable puller pulley 630. At that point, the cable 150 leaves the puller portion 132 and engages with the activator 142 and the other portions of the extendable grabber 100. By using the two pulleys 630, 650, the puller portion 132 increases (effectively doubles) the distance of the pull on the cable 150 when compared to the physical movement of the trigger 600. Other types of mechanical advantage can be implemented using a plurality of pulleys to connect the trigger 600 to the cable 150.

Figure 7:
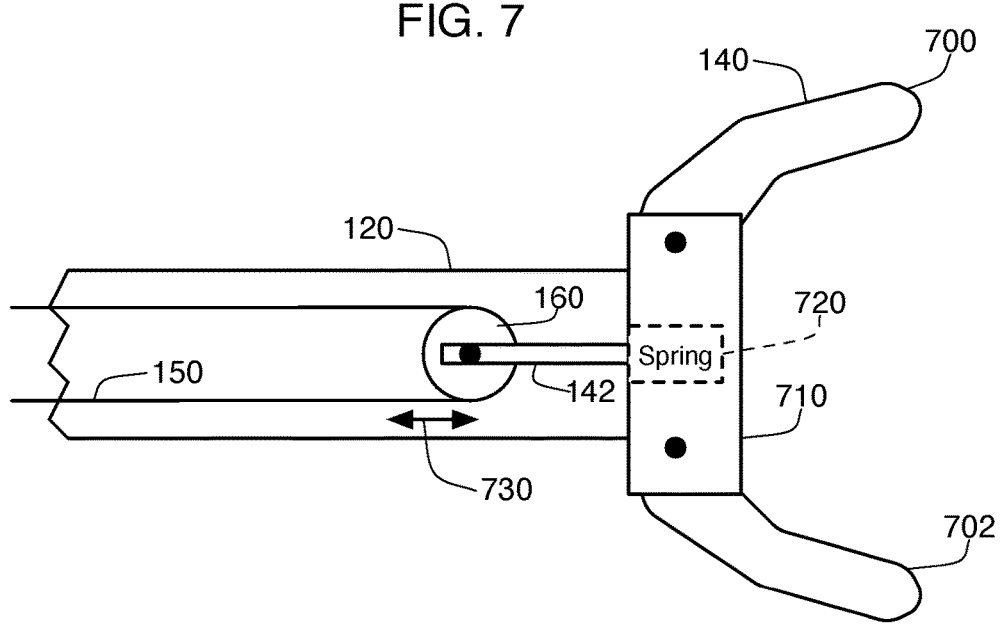
FIG. 7 is a schematic view of a grabber head portion of the embodiment of FIG. 1.

FIG. 7 shows one embodiment of a head portion 140. The cable 150 wraps around pulley 160, which is moveable with respect to second extension 120. The pulley is attached to the activator 142, which can take the form of a simple rod as shown in FIG. 7. Movement of the activator 142 away from the head 140 (such as by pulling the trigger 600) engages the internal mechanism in the body 710 of the head 140 that causes the arms 700, 702 of the grabber head 140 to close together. This internal mechanism is well known in the art of grabber heads. In most embodiments, a spring 720 is located in the body 710 of the head portion 140 which encourages the activator 142 back to a rest position in which the grabber arms 700, 702 are in the open position. Technically, this spring 720 is located between the pulley 160 and at least some portion of the head 140. This spring 720 cooperates with spring 610 to return the activator 142 and the trigger 600 into a rest position after the trigger 600 is pulled. Since these springs 720, 610 act together, some embodiments will only have may only have a single spring, such as only spring 720.

The pulling of the trigger 600 pulls the cable 150, which in turn causes the moveable pulley 160 to move, as is indicated by the arrows 730 shown in FIG. 7. This moves the activator 142, which closes the grabber arms 700, 702. The amount of closing force and/or distance moved by the arms 700, 702 will vary depending on the force applied and distance moved by the trigger 600. Note that this force and distance will remain constant as the extendable grabber 100 moves between the extended position of FIG. 1 and the retracted position of FIG. 3.

Figure 8:
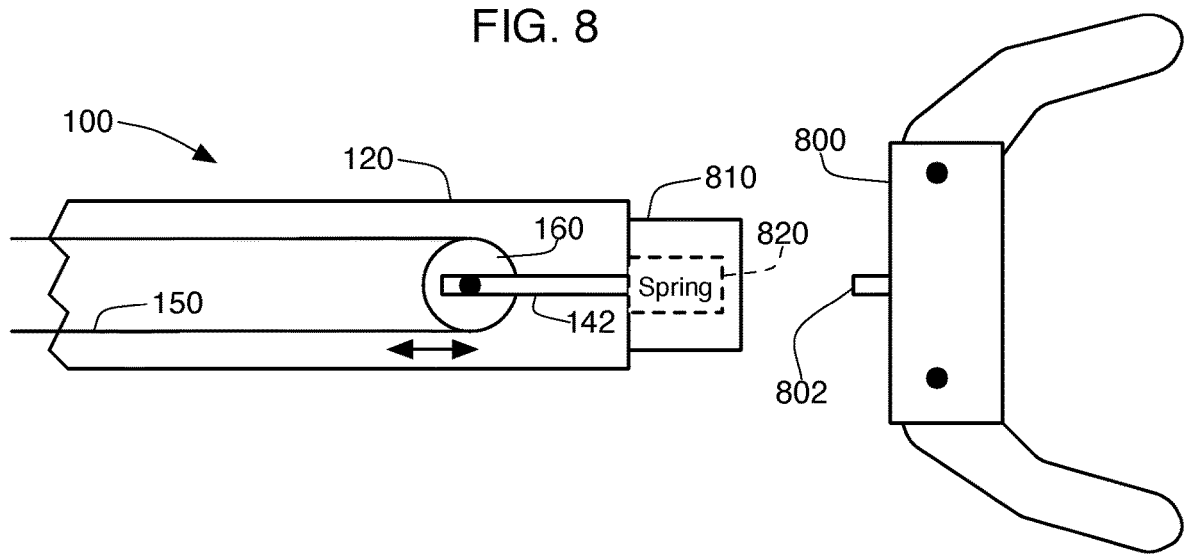
FIG. 8 is an exploded, schematic view of an alternative embodiment including a replaceable head portion of the extendable grabber.

FIG. 8 shows an alternative embodiment in which the grabber head 800 is removeable from the extendable grabber 100. In this case, a mount 810 is attached to the head end 126 of the second extension portion 120 instead of head 140. The mount 810 includes attachment mechanisms that allow the removeable grabber head 800 to be removably attached the mount 810. Various attachment mechanisms could be used, include nuts and bolts, holes and pins (such as cotter pins), or spring-loaded ball detents (none of which are shown in the figures). In one embodiment, the spring 820 that is attached to the activator 142 is position within the mount 810 so that it is not necessary to contain it within the removable head 800. Positioning the spring 820 in the mount ensures that the cable 150 does not go slack when head 800 is removed. The mount 810 must actively engage the actuator 802 of the removable head 800 with the activator 142 that moves with the cable 150 and trigger 600. This can be accomplished in a variety of ways known in the art.

In the above figures, the head 140, 800 is shown as a grabber with two arms. The above invention is not limited to only two arms, as a three- or four-armed grabber (capable, for example, of holding a light bulb) could be attached to the extendable grabber 100. Alternatively, different types of heads could be provided for the removable head embodiment shown in FIG. 8. One replaceable head might, for example, extend or retract a spike or blades, as might be useful in gardening or other applications. Regardless of the configuration of the removable head 800, the disclosed embodiments allow a trigger 600 to apply a constant force to the head 800 (when attached) through a cable 150 while extending and retracting the device 100. Multiple replaceable heads of different configurations could be provided together with the remainder of the grabber 100 to form a set.

The above description refers to the use of pulleys. In a preferred embodiment, the pulleys have a wheel that rotates around an axle or shaft. However, the term should also be considered to apply to a smooth shaft around which the cable can move and change direction without a significant amount of friction. Such a shaft will usually have side walls to keep the cable from moving lengthwise along the shaft. Alternatively, the pulley could be formed from a portion of one of the other components of the grabber 100. For example, pulley 162 could be formed by forming a smooth groove or a hole in a portion of a wall of the second extension portion 120, while pulley 160 could be formed simply by a smooth hole formed in a metal activator 142.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. An extendable grabber comprising:
   a) a cable having a first end and a second end;
   b) a first extension portion having a handle end and a distal end;
   c) a handle attached to the handle end of the first extension portion, the handle having a trigger mechanically attached to the first end of the cable for pulling the cable;
   d) a terminal attachment attached to the distal end of the first extension portion and attached to the second end of the cable;
   e) a second extension portion having a proximal end and a head end, the second extension portion being mechanically engaged with the first extension portion so as to be moveable between an extended position and a retracted position;
   f) a head attached to the head end of the second extension portion, the head actively engaged to a middle part of the cable through a first pulley such that a pull on the first pulley by the cable activates the head; and
   g) a second pulley attached at the proximal end of the second extension portion, the cable extending from the trigger to the first pulley, then to the second pulley, then to the terminal attachment.

2. The extendable grabber of claim 1, wherein the cable is a string.

3. The extendable grabber of claim 1, wherein the second pulley comprises a hole through a wall of the second extension portion.

4. The extendable grabber of claim 1, wherein the first pulley comprises a wheel that rotates around an axle.

5. The extendable grabber of claim 1, wherein the first extension portion and the second extension portion each have a uniform cross-section where the first extension portion is mechanically engaged with the first extension portion.

6. The extendable grabber of claim 5, wherein the first extension portion extends into a hollow interior of the second extension portion.

7. The extendable grabber of claim 6, wherein the first extension portion comprises a size and shape that prevents significant rotation within the hollow interior of the second extension portion.

8. The extendable grabber of claim 6, wherein the first extension portion is prevented from any significant rotation inside the second extension portion through a protrusion and a track.

9. The extendable grabber of claim 8, wherein the protrusion extends from an exterior surface of the first extension portion and glides within a track found on an interior surface of the second extension portion.

10. The extendable grabber of claim 1, wherein the second extension portion further comprising a groove through which passes a portion of the cable between the second pulley and the terminal attachment.

11. The extendable grabber of claim 1, wherein the second extension portion further comprising a groove through which passes the terminal attachment.

12. The extendable grabber of claim 1, wherein the trigger moves from an activating position that pulls the cable against tension, and a resting position, further wherein a spring provides tension to urge the trigger to the resting position.

13. The extendable grabber of claim 12, wherein the spring is positioned between the trigger and a non-moving handle portion.

14. The extendable grabber of claim 12, wherein the spring is positioned between the first pulley and at least a portion of head.

15. The extendable grabber of claim 1, wherein the head is removably attached to the head end of the second extension portion.

16. The extendable grabber of claim 1, wherein the trigger is mechanically attached to the first end of the cable via a plurality of pulleys to provide an increase of pulling distance on the cable.

17. The extendable grabber of claim 1, wherein the distal end of the first extension portion is located within twenty percent of a terminus of the first extension portion and further wherein the proximal end of the second extension portion is located within twenty percent of a terminus of the second extension portion.

18. A grabber set comprising:
   a) a cable having a first end and a second end;
   b) a first extension portion having a handle end and a distal end;
   c) a handle attached to the handle end of the first extension portion, the handle having a trigger mechanically attached to the first end of the cable for pulling the cable;
   d) a terminal attachment attached to the distal end of the first extension portion and attached to the second end of the cable;
   e) a second extension portion having a proximal end and a head end, the second extension portion being mechanically engaged with the first extension portion so as to be moveable between an extended position and a retracted position;
   f) an activator attached to the head end of the second extension portion, the activator actively engaged to a middle part of the cable through a first pulley such that a pull on the first pulley by the cable moves the activator;

g) a second pulley attached at the proximal end of the second extension portion, the cable extending from the trigger to the first pulley, then to the second pulley, then to the terminal attachment;

h) a mount for replaceable heads attached to the head end of the second extension portion, the mount having an attachment mechanism for the replaceable heads;

i) a first replaceable grabber head adapted to be mounted on the mount, the first replaceable grabber head having a first actuator that engages with the activator when mounted; and j) a second replaceable grabber head adapted to be mounted on the mount, the second replaceable grabber head having a second actuator that engages with the activator when mounted, wherein the second replaceable grabber head has a different number of arms than the first replaceable grabber head.

19. The grabber set of claim 17, wherein the mount comprises a spring that pulls on the activator, further wherein neither the first replaceable grabber head nor the second replaceable grabber head contains any springs.

20. An extendable grabber comprising:

a) a cable having a first end and second end;

b) a first extension portion having a handle end and a distal end;

c) a handle attached to the handle end of the first extension portion, the handle having a trigger and a rod, the rod being mechanically attached to the trigger and the first end of the cable;

d) a terminal attachment attached to the distal end of the first extension portion and attached to the second end of the cable;

e) a second extension portion having a proximal end and a head end, the second extension portion being mechanically engaged with the first extension portion so as to be moveable between an extended position and a retracted position;

f) a head attached to the head end of the second extension portion, the head actively engaged to a middle part of the cable such that increased tension on the cable activates the head; and g) a pulley attached at the proximal end of the second extension portion, the cable extending from the trigger to the head, then to the pulley, then to the terminal attachment.

21. The extendable grabber of claim 20, wherein the head further comprises an activator that is attached to the middle part of the cable.

\* \* \* \* \*